(12) United States Patent
Brindel et al.

(10) Patent No.: US 7,289,740 B1
(45) Date of Patent: Oct. 30, 2007

(54) WDM REGENERATED TRANSMISSION SYSTEM

(75) Inventors: Patrick Brindel, Longport S/Orge (FR); Bruno Dany, Paris (FR); Emmanuel Desurvire, Bruyeres le Chatel (FR)

(73) Assignee: ALCATEL, Paris (FR)

( * ) Notice: Subject to any disclaimer, the term of this patent is extended or adjusted under 35 U.S.C. 154(b) by 0 days.

(21) Appl. No.: 09/493,091

(22) Filed: Jan. 28, 2000

(30) Foreign Application Priority Data

Feb. 19, 1999 (FR) .................................. 99 02126

(51) Int. Cl.
*H04B 10/16* (2006.01)
*H04J 14/02* (2006.01)

(52) U.S. Cl. ....................................... 398/175; 398/97
(58) Field of Classification Search ................ 359/124, 359/176, 174; 398/97, 175, 181, 173
See application file for complete search history.

(56) References Cited

U.S. PATENT DOCUMENTS

| 5,050,949 | A | * | 9/1991 | DiGiovanni et al. ...... 359/337.3 |
| 5,524,144 | A | * | 6/1996 | Suzuki ........................ 398/181 |
| 5,822,106 | A | * | 10/1998 | Knox et al. ................... 359/245 |
| 5,847,862 | A | * | 12/1998 | Chraplyvy et al. .......... 359/337 |
| 6,023,366 | A | * | 2/2000 | Kinoshita ............... 359/337.12 |
| 6,067,179 | A | * | 5/2000 | Roberts et al. ................ 398/97 |
| 6,108,125 | A | * | 8/2000 | Yano .......................... 359/344 |
| 6,195,480 | B1 | * | 2/2001 | Kosaka et al. ................. 385/24 |
| 6,256,125 | B1 | * | 7/2001 | Uehara ........................ 359/124 |
| 6,337,755 | B1 | * | 1/2002 | Cao ............................ 359/124 |
| 6,370,300 | B1 | * | 4/2002 | Eggleton et al. .............. 385/37 |
| 6,396,607 | B1 | * | 5/2002 | Cao ............................ 398/154 |
| 6,400,498 | B1 | * | 6/2002 | Shimomura et al. ..... 359/341.1 |
| 6,433,899 | B1 | * | 8/2002 | Anslow et al. ................. 398/5 |
| 6,480,312 | B1 | * | 11/2002 | Okuno et al. ............... 398/158 |
| 6,512,613 | B1 | * | 1/2003 | Tanaka et al. ................ 398/97 |
| 7,054,559 | B1 | * | 5/2006 | Le et al. ....................... 398/79 |

FOREIGN PATENT DOCUMENTS

| EP | 0 579 401 A1 | | 1/1994 |
| EP | 812 078 A2 | | 12/1997 |
| WO | WO98/05133 | * | 2/1998 |
| WO | WO98/35459 | | 8/1998 |

OTHER PUBLICATIONS

W. Bo et al., "Fiber Gratings Based Optical Add/Drop Multiplex with Low Interferometric Crosstalk", International Conference on Communication Technology, ICCT'98, Oct. 22-24, 1998.*
ITU-T G.692, "Optical Interfaces for Multichannel Systems with Optical Amplifiers", Oct. 1998, pp. 1, 4-5.*

* cited by examiner

*Primary Examiner*—Shi K Li
(74) *Attorney, Agent, or Firm*—Sughrue Mion, PLLC

(57) ABSTRACT

A multichannel wavelength-division multiplex fiber optic transmission system includes an optical transmitter and an optical receiver connected by an optical line including at least one optical fiber and at least one set of channel regenerators. Successive regenerators regenerate respective groups of channels forming a subset of the set of channels.

23 Claims, 2 Drawing Sheets

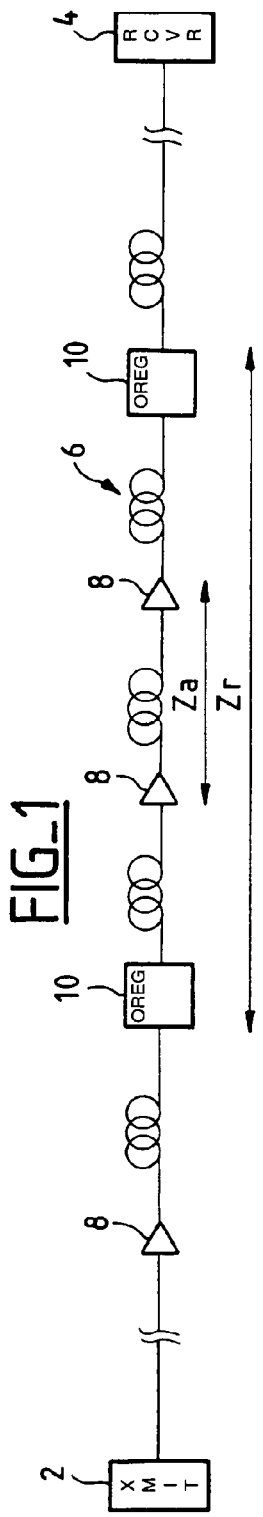
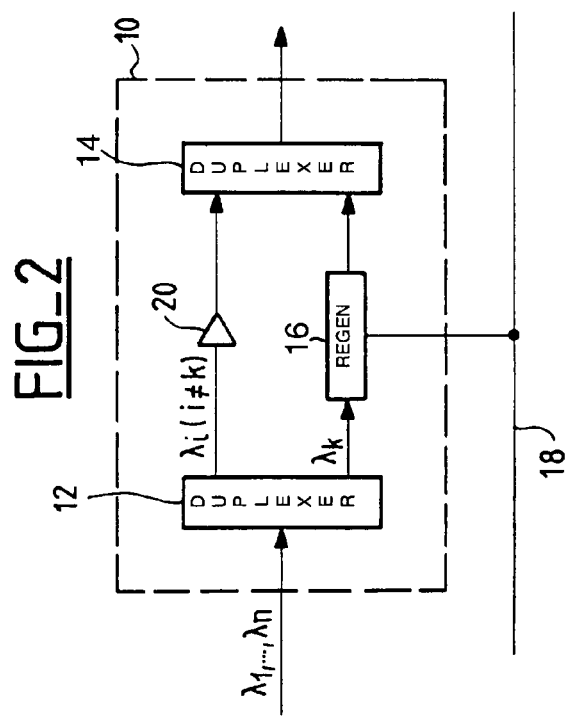
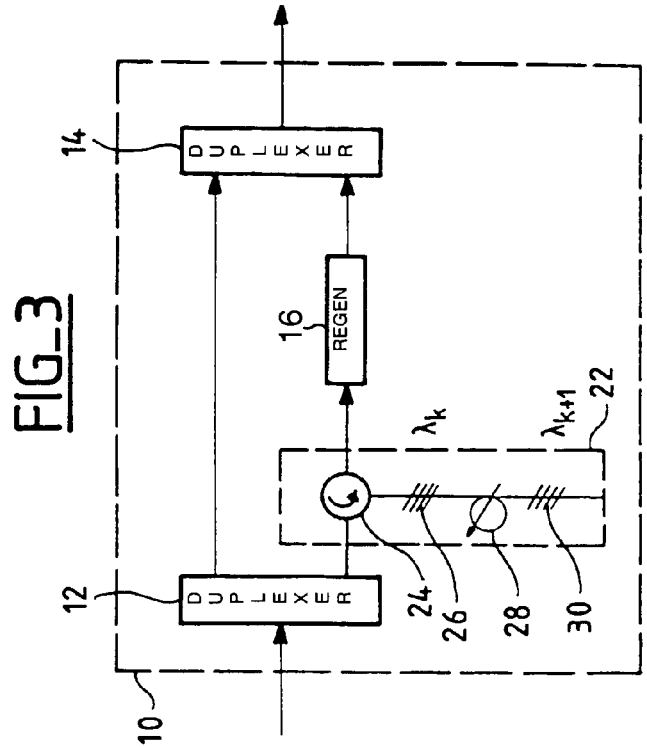

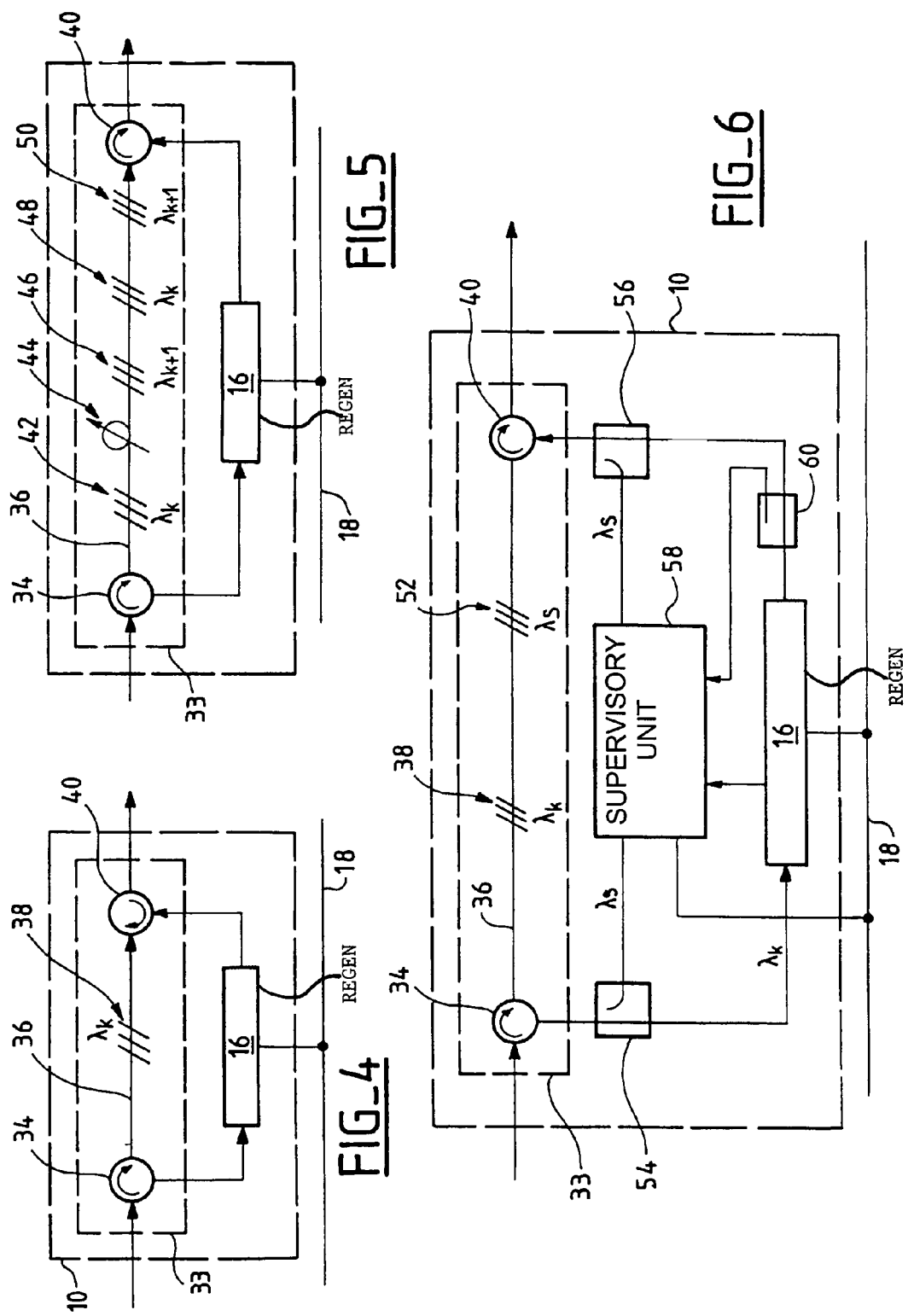

WDM REGENERATED TRANSMISSION SYSTEM

BACKGROUND OF THE INVENTION

1. Field of the Invention

The present invention concerns wavelength-division multiplex fiber optic transmission systems and more particularly the regeneration of signals therein.

2. Description of the Prior Art

It is well known that to transmit optical signals over very long distances, as in the case of transoceanic transmission by submarine cable, it is necessary to amplify the optical signals periodically to compensate the attenuation of the signal and to reshape the signals to compensate distortion induced by the transmission medium or by interaction between the various signals of the multiplex. The distortion is compensated by "3R" regenerators ("3R" signifying "reshaping", "retiming" and "reamplifying") whose functions include reshaping the pulses, retiming the pulses and compensating pulse intensity losses in the regenerator.

Wavelength-division multiplexed (WDM) transmission systems are tending to include more and more channels (or wavelengths) on each optical fiber. The bit rate per channel is also increasing. Thus the most recent transoceanic transmission systems have a capacity of 32 channels each of 10 Gbit/s.

There are various ways to regenerate the signals of each channel in such systems. One solution is to demultiplex the signals and to regenerate each signal individually. However, this solution has the disadvantage of requiring as many regenerators as there are multiplexed signals which, given the trend for the number of channels to increase, leads to a complex and physically large regenerator, also requiring a powerful electrical power supply, which represent heavy penalties in the case of transmission via submarine cable.

Another solution which can be used in the case of soliton WDM signals (or RZ signals converted into solitons at the regenerator input) consists in using a regenerator including means for compensating chromatic dispersion in order to resynchronize the various channels followed by a synchronous modulator. This solution has the disadvantage of requiring very accurate control of chromatic dispersion so that the signals are perfectly synchronized at the input of the synchronous modulator. Controlling the chromatic dispersion is all the more difficult in that it must be achieved for a large number of channels.

It has also been proposed, in the case of WDM soliton signals, to dispose the regenerators along the optical line at locations where a certain number of channels are naturally synchronous, and to regenerate only these channels at each of these locations (see WO-A-98 35459). However, this technique introduces a constraint on the position of the regenerators which can sometimes be problematical, depending on the number of channels and their wavelength spacing.

The invention proposes a simple solution to the problem of regenerating channels in a WDM transmission system, and one which remains simple even if the number of channels is high.

SUMMARY OF THE INVENTION

To be more precise, the invention proposes a multichannel wavelength-division multiplex fiber optic transmission system including an optical transmitter and an optical receiver connected by an optical line including at least one optical fiber and at least one set of channel regenerators, wherein successive regenerators regenerate respective groups of channels forming a subset of the set of channels.

The number of groups is preferably a submultiple of the total number of regenerators.

The groups of channels preferably include a small number of channels, in particular a single channel or two channels.

This greatly simplifies the structure of the regenerator, compared to the solutions which demultiplex all the signals or compensate chromatic dispersion of all the signals with respect to each other.

Each regenerator advantageously includes an optical regenerator unit.

If a plurality of channels are regenerated in the same regenerator, each regenerator can include means for synchronizing the channels to be regenerated and an optical regenerator unit, in particular a synchronous modulator.

In a first preferred embodiment of the invention each regenerator includes a demultiplexer and a multiplexer in order to process independently channels which are to be regenerated and channels which are not to be regenerated.

In a second preferred embodiment of the invention each regenerator includes an inserter/extractor system for isolating the channels which are to be regenerated.

A system in accordance with the invention can additionally include a compensator amplifier for compensating intensity differences between regenerated channels and non-regenerated channels.

The transmission system advantageously includes supervisory means using a dedicated channel. In a transmission system of the above kind, each regenerator can include means for separating the dedicated channel from the other channels, a supervisory unit for modifying the signal of the dedicated channel as a function of information relating to the status of the regenerator, and means for remultiplexing the dedicated channel with the other channels.

In particular, each regenerator can include a regenerator unit for regenerating the channels of a group of channels, the supervisory unit receiving information from said regenerator unit and also receiving a fraction of the regenerated signal delivered by said regenerator unit.

The system of the invention preferably includes a plurality of spaced optical amplifiers and spaced optical regenerators and the spacing of the optical regenerators is preferably a multiple of the spacing of the optical amplifiers.

The features and advantages of the invention will emerge more clearly from the following description which is given with reference to the accompanying drawings and by way of illustrative and non-limiting example only.

BRIEF DESCRIPTION OF THE DRAWINGS

FIG. 1 shows the general structure of optical transmission system including regenerators in prior art, and partial transmission system including regenerators in the present invention.

FIG. 2 shows one embodiment of a regenerator in accordance with the invention.

FIG. 3 shows a variant of the regenerator shown in FIG. 2 which is adapted to regenerate two channels.

FIG. 4 shows another embodiment of a regenerator in accordance with the invention which is adapted to regenerate a single channel.

FIG. 5 shows a variant of the regenerator shown in FIG. 4 which is adapted to regenerate two channels.

FIG. 6 shows an optical transmission system in accordance with the invention equipped with optical supervisory means.

DETAILED DESCRIPTION OF THE PREFERRED EMBODIMENTS

FIG. 1 shows a conventional optical transmission system. It includes two terminal stations, namely a transmitter 2 (XMIT) and a receiver 4 (RCVR), connected by a fiber optic link 6. Amplifiers 8 are provided at regular intervals along the optical fiber to re-amplify the signals and so compensate losses due to absorption by the optical fiber. The distance $Z_a$ between two consecutive amplifiers depends on many parameters (signal intensity, absorption by the optical fiber, wavelength separation between the signals, etc.); it is typically from 50 km to 100 km. The transmission system further includes optical regenerators 10 (OREG). The distance $Z_r$ between two successive regenerators also depends on many parameters (Kerr effect, Gordon-Haus jitter, four-wave interaction, etc.) which affect the shape of the pulses and induce an offset of the pulses relative to their nominal bit time. The regenerators are generally disposed at a distance $Z_a$ relative to amplifier 10 and including an amplifier similar to the amplifiers 8. The distance $Z_r$ between two regenerators is equal to $k.Z_a$, where k is an integer generally from 5 to 10 and depending in particular on the bit rate of the signals of the multiplex.

The invention differs from prior art transmission systems in that each regenerator regenerates a small number of channels. For example, for a WDM system with n wavelengths $\lambda_1, \lambda_2, \ldots, \lambda_n$ (n being equal to 32, for example), each regenerator could be designed to regenerate only one wavelength. In other words, the n channels could be divided into n groups $G_1, G_2, \ldots, G_n$ each including only one channel. There would then be in succession along the line, with intervals $Z_r$ between each regenerator and the next, a regenerator $R_1$ to regenerate the channel $\lambda_1$, a regenerator $R_2$ for the channel $\lambda_2, \ldots$, a regenerator $R_n$ for the channel $\lambda_n$, another regenerator $R_1$ for the channel $\lambda_1$, etc. The important advantage is the simplification of the system by virtue of the fact that each regenerator has a simple structure.

Instead of a single channel per group, a transmission system can be provided in which the n channels are divided into n/2 groups, each including two channels, and more generally a system in which the n channels are divided into p groups each including n/p channels.

Finally, the channels can be divided unequally between the groups, for example two channels in group $G_1$, three channels in group $G_2$, two channels in group $G_3$, etc.

The description with reference to the subsequent figures shows that each regenerator has exactly the same structure. This simplifies the design of the system and the manufacture of the regenerators, which increases the reliability of the transmission system.

FIG. 2 shows a first embodiment of a regenerator designed to regenerates only one channel. It has at the input a duplexer 12 for separating the channel λk to be regenerated from the other channels λi ($1 \leq i \leq n$; i≠k) and at the output a duplexer 14 for remultiplexing the channel λk with the other channels. The regenerator unit 16 (REGEN) can be of any type known in the art and advantageously includes a synchronous optical modulator in the case of soliton signals or RZ signals converted into solitons.

Generally, although optical regenerator units are currently preferred, the use of opto-electrical regenerator units, i.e. regenerator units in which the optical signals are converted into electrical signals, regenerated in electrical form and then converted back into optical signals, is not excluded from the scope of the present invention.

The regenerator units are powered by an electrical cable 18 (not shown in FIG. 1). A compensator amplifier 20 in the branch of the regenerator receiving the non-regenerated channels compensates the intensity difference between the non-regenerated channels and the channel $\lambda_k$. In some embodiments, there could instead be a compensator amplifier of this kind in the branch receiving the regenerator unit 16, should the latter induce an intensity loss in the channel $\lambda_k$.

When the regenerator 10 is at a distance $Z_a$ from the preceding amplifier 8 (see FIG. 1), the regenerator 10 shown in FIG. 2 further includes an amplifier 8. This amplifier is preferably at the output of the regenerator 10, but could also be at its input. It could also replace the amplifier 20 shown in FIG. 2, in respect of the non-regenerated channels. In this case, the regenerator unit 16 would have also to include an amplifier at the output of the regenerator 10 to amplify the signals to be regenerated to the same intensity as non-regenerated signals. The latter arrangement is particularly beneficial because the number of signals that each amplifier must amplify is then smaller, as compared to the line amplifiers 8 (FIG. 1). Amplifiers of lower power or a greater power margin can then be used in the regenerators.

FIG. 3 shows an embodiment similar to that shown in FIG. 2, but adapted to regenerate two channels $\lambda_k$ and $\lambda_{k+1}$. The only difference compared to the regenerator shown in FIG. 2 is the provision of synchronization means 22 upstream of the regenerator unit 16 to synchronize the two channels to be regenerated. Synchronization means of this kind can simply be obtained, as shown here, with the aid of a three-port optical circulator 24 and a delay line 26 including two optical reflectors, for example Bragg filters 28, 30, spaced from each other so that the channels are resynchronized when they reach the regenerator unit 16. The delay between the channels can be adjusted by means of a variable delay line 32.

FIG. 4 shows a second embodiment of a regenerator designed to regenerate a single channel. It essentially includes an inserter/extractor system 33 which is a standard component in the field of optical transmission systems and a regenerator unit 16 (REGEN). The inserter/extractor system 33 includes a first three-port optical circulator 34, a section 36 of optical line provided with an optical reflector 38, for example a Braggg filter, to reflect the channel $\lambda_k$, and a second optical circulator 40. These components are arranged, in a manner well known in the art, to extract the channel $\lambda_k$ from the optical line and to direct it to the input of the regenerator unit 16 (REGEN) and to insert the regenerated channel $\lambda_k$ received from the regenerator unit 16 (REGEN) into the optical line.

It is important to note that the optical regenerator unit can be exactly the same for all the channels, for example in the case where the regenerator includes a synchronous modulator, with the result that the regenerator 10 can be adapted to any channel simply by choosing the wavelength to be reflected by the optical reflector 38. Thus the transmission system shown in FIG. 1 can be equipped with identical regenerators, which are "personalized" only in terms of the wavelength of the optical reflector 38, which simplifies manufacture, reduces costs and increases reliability.

The regenerator shown in FIG. 4 can be adapted, as shown in FIG. 5, to regenerate two channels $\lambda_k$ and $\lambda_{k+1}$. This regenerator differs from that shown in FIG. 4 in that the line section 36 between the optical circulators 34 and 40 includes two optical reflectors for each channel. To be more precise, there are in succession on this line section: an optical reflector 42 for the channel $\lambda_k$, a variable delay line 44 and an optical reflector 46 for the channel $\lambda_{k+1}$, this combination forming resynchronization means similar to the resynchronization means 22 shown in FIG. 3, an optical reflector 48 for the channel $\lambda_k$ and an optical reflector 50 for the channel $\lambda_{k+1}$.

The regenerator shown in FIG. 5 can be modified to regenerate more than two channels. Obviously, for this it is sufficient to add to the line section 36 optical reflectors adapted to reflect the channels to be regenerated and delay lines like the lines 44, if necessary.

Note that the compensator amplifier 20 of the regenerator shown in FIG. 2, intended to compensate an intensity difference between the channel or channels regenerated and non-regenerated channels, can be between the optical reflectors 46 and 48 in the case of the regenerator as shown in FIG. 5.

Over and above the structural simplicity of the transmission system in accordance with the invention, an additional advantage is the possibility of implementing a system element supervisory function in a simple manner. As is well known in the art, supervision consists in transmitting a signal over the line which is processed in each amplifier or regenerator to include therein information relating to the status, performance, etc. of the amplifiers and regenerators. This supervisory signal is on a specific channel in the bandwidth of the multiplex. The drawback of the prior art systems is that all the channels are regenerated simultaneously, which implies complex supervisory means in each regenerator (supervision of all WDM channels and associated synchronous modulators).

The transmission system in accordance with the invention has the advantage of enabling each regenerator to be supervised in a simpler manner.

FIG. 6 shows a regenerator similar to that shown in FIG. 4, but with added supervisory means. The components identical to those in FIG. 4 carry the same reference numbers.

The supervisory means in the regenerator shown in FIG. 6 include: an optical reflector 52 for extracting and then inserting the supervisory channel $\lambda_s$, an optical coupler or demultiplexer 54 for separating the channels $\lambda_k$ and $\lambda_s$ extracted from the line by the circulator 34 and the reflectors 38, 52, an optical coupler or multiplexer 56 for remultiplexing the channels $\lambda_k$ and $\lambda_s$ after they have been processed, and a supervisory unit 58 for receiving information on the status of the regenerator 16 (REGEN) and on the status of the channel $\lambda_k$ via an optical coupler 60 sampling a portion of the signal on the channel $\lambda_k$ at the output of the regenerator 16 (REGEN), the supervisory unit 58 transmitting that information on the channel $\lambda_s$ to the optical coupler or multiplexer 56.

Supervision is simpler than in the prior art because it takes account of only a small number of channels of the multiplex at each regenerator (only one channel in the case of FIG. 4).

The invention is not limited to the embodiments described but to the contrary encompasses all variants that are within the scope of the following claims.

The invention claimed is:

1. A multichannel wavelength-division multiplex fiber optic transmission system, comprising:
    an optical transmitter; and
    an optical receiver connected to the optical transmitter by an optical line, the line comprising:
        at least one optical fiber, and
        at least one set of channel regenerators,
    wherein each one of the set of channel regenerators regenerates, by compensating for a distortion of a signal, only a predetermined respective group of channels, each respective group forming a non-overlapping subset of a set of channels to be regenerated, and each channel of the groups is predetermined based on channel wavelength, and
    wherein each channel regenerator is positioned at a predetermined distance on the optical line from other channel regenerators from said at least one set of channel regenerators and said each channel regenerator is positioned in series with respect to other channel regenerators from said at least one set of channel regenerators, and
    wherein the set of channels transmits signals from the transmitter to the receiver.

2. The system claimed in claim 1, wherein the number of channel regenerators is a submultiple of the number of channels and wherein the distortion of the signal is compensated by reshaping, reamplifying, and retiming the signal.

3. The system claimed in claim 1 wherein each group includes only one channel.

4. The system claimed in claim 3 wherein each regenerator is an optical regenerator.

5. The system claimed in claim 4, wherein each channel regenerator comprises a synchronous modulator.

6. The system as claimed in claim 3, wherein said each group includes only one channel regardless of a number of channels in the transmission system.

7. The system as claimed in claim 6, wherein a number of regenerators in said at least one set of channel regenerators depends at least partially on the number of channels in said transmission system.

8. The system as claimed in claim 7, wherein the set of channel regenerators successively regenerates the set of channels by having each one of the set of channel regenerators regenerate only the predetermined, respective group of channels, and wherein the set of channels to be regenerated is a plurality of channels regenerated by the set of channel regenerators.

9. The system as claimed in claim 8, wherein channels that are not regenerated in a regenerator of the set of channel regenerators, are amplified to compensate intensity difference between the channels not regenerated and the regenerated channels.

10. The system claimed in claim 1 wherein at least one group includes a plurality of the channels.

11. The system claimed in claim 10, wherein the regenerator for the group having the plurality of channels comprises:
    means for synchronizing the plurality of channels, and
    an optical regenerator unit performing the regenerating of the plurality of channels.

12. The system claimed in claim 1, wherein each channel regenerator comprises an inserter/extractor system for isolating channels to be regenerated.

13. The system as claimed in claim 1 further comprising supervisory means using a dedicated channel.

14. The system claimed in claim 13, wherein each channel regenerator comprises:
    means for separating said dedicated channel from the other channels, a supervisory unit for transmitting information relating to the status of said regenerator on said dedicated channel, and means for remultiplexing said dedicated channel with the other channels.

15. The system claimed in claim 14, wherein:

each channel regenerator includes a regenerator unit for regenerating the channels of a group of channels, and the supervisory unit receives information from said regenerator unit and a portion of the regenerated signal delivered by said regenerator unit.

16. The system as claimed in claim 1 further comprising:

a plurality of spaced optical amplifiers, and a plurality of spaced optical regenerators forming said at least one set of channel regenerators, wherein the spacing of said optical regenerators is a multiple of the spacing of said optical amplifiers.

17. The system as claimed in claim 1, wherein the set of channel regenerators comprises a first channel regenerator and a plurality of other channel regenerators, and wherein each channel from the predetermined group of channels regenerated by the first channel regenerator is not regenerated by said plurality of other channel regenerators.

18. The system as claimed in claim 1, wherein each channels of said set of channel is regenerated by only one channel regenerator from a set of channel regenerators of said at least one set of channel regenerators, wherein each regenerator is an independent physical device separate from other channel regenerators in the set, and wherein said each channel regenerator of the set of channel regenerators is sequentially positioned on the optical line so as not to parallel the other channel regenerators in the set of channel regenerators.

19. The system as claimed in claim 1, wherein channels that are not regenerated in a regenerator of the set of channel regenerators, are amplified to compensate intensity difference between the channels not regenerated and the regenerated channels.

20. The system as claimed in claim 1, wherein each of the channel regenerator of the set of channel regenerators is positioned parallel to at least one amplifier that amplifies channels that are not regenerated by said respective channel regenerator.

21. The system as claimed in claim 1, wherein the set of channel regenerators are positioned on the same optical line.

22. A multichannel wavelength-division multiplex fiber optic transmission system, comprising:

an optical transmitter; and an optical receiver connected to the optical transmitter by an optical line, the line comprising:

at least one optical fiber, and at least one set of channel regenerators, wherein each one of the set of channel regenerators regenerates only a predetermined respective group of channels, each respective group forming a non-overlapping subset of a set of channels to be regenerated, and each channel of the groups is predetermined based on channel wavelength, wherein each channel regenerator is positioned at a predetermined distance on the optical line from other channel regenerators from said at least one set of channel regenerators, and wherein a channel regenerator comprises a demultiplexer and a multiplexer, wherein the respective predetermined group of channels is demultiplexed and regenerated by the channel regenerator and rest of the demultiplexed channels are not regenerated in the channel regenerator.

23. A multichannel wavelength-division multiplex fiber optic transmission system, comprising:

an optical transmitter; and an optical receiver connected to the optical transmitter by an optical line, the line comprising:

at least one optical fiber, and at least one set of channel regenerators, wherein each one of the set of channel regenerators regenerates, by compensating for a distortion of a signal, only a predetermined respective group of channels, each respective group forming a non-overlapping subset of a set of channels to be regenerated, and each channel of the groups is predetermined based on channel wavelength, wherein each channel regenerator is positioned at a predetermined distance on the optical line from other channel regenerators from said at least one set of channel regenerators, and wherein each channel regenerator comprises a regeneration unit and a compensator amplifier compensating intensity differences between regenerated and non-regenerated channels.

* * * * *